United States Patent
Liu et al.

(10) Patent No.: US 12,250,209 B2
(45) Date of Patent: Mar. 11, 2025

(54) NETWORK IDENTITY PROTECTION METHOD AND DEVICE, AND ELECTRONIC EQUIPMENT AND STORAGE MEDIUM

(71) Applicant: GUANGDONG UNIVERSITY OF TECHNOLOGY, Guangzhou (CN)

(72) Inventors: Wenyin Liu, Guangzhou (CN); Chao Mai, Guangzhou (CN); Xiangbin Xian, Guangzhou (CN); Hongwen Wu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 313 days.

(21) Appl. No.: 17/888,236

(22) Filed: Aug. 15, 2022

(65) Prior Publication Data
US 2022/0394026 A1     Dec. 8, 2022

Related U.S. Application Data

(63) Continuation of application No. PCT/CN2020/098484, filed on Jun. 28, 2020.

(51) Int. Cl.
*G06F 15/16* (2006.01)
*G06Q 20/38* (2012.01)
(Continued)

(52) U.S. Cl.
CPC ......... *H04L 63/083* (2013.01); *G06Q 20/389* (2013.01); *G06Q 40/08* (2013.01)

(58) Field of Classification Search
CPC .......................... H04L 63/083; G06Q 20/389
See application file for complete search history.

(56) References Cited

U.S. PATENT DOCUMENTS 10,108,954 B2   10/2018   Dunlevy et al.
10,698,997 B2 *  6/2020   Li ......................... H04L 9/3236
(Continued)

FOREIGN PATENT DOCUMENTS

CN     104426861 A     3/2015
CN     107147652 A     9/2017
(Continued)

*Primary Examiner* — Hieu T Hoang

(57) ABSTRACT

A network identity protection method and device, and electronic equipment and a computer-readable storage medium. The method includes: after receiving a claim settlement request of target account information, obtaining all first transaction credentials corresponding to the target account information from a smart contract, where the target account information is configured for login to a target application or website; the first transaction credentials are configured to record login information corresponding to login requests uploaded by a server of the target application or website; obtaining all second transaction credentials corresponding to the target account information from blockchain nodes in a blockchain network, where the second transaction credentials are configured to record login information corresponding to login requests for normally authorized login to the target application or website; and comparing the first transaction credentials with the second transaction credentials to respond to the claim settlement request.

7 Claims, 5 Drawing Sheets

(51) Int. Cl.
  *G06Q 40/08* (2012.01)
  *H04L 9/40* (2022.01)

(56) References Cited

U.S. PATENT DOCUMENTS

| | | | |
|---|---|---|---|
| 10,972,475 B1* | 4/2021 | Zaki | G06F 21/604 |
| 11,308,487 B1* | 4/2022 | Foster | G06Q 20/3829 |
| 2018/0075453 A1* | 3/2018 | Durvasula | G06Q 20/3678 |
| 2019/0132350 A1* | 5/2019 | Smith | G06F 21/60 |
| 2019/0163896 A1* | 5/2019 | Balaraman | G06F 21/41 |
| 2019/0372786 A1* | 12/2019 | Ra | G06F 21/30 |
| 2020/0005282 A1* | 1/2020 | Kim | G06Q 20/065 |
| 2020/0052899 A1* | 2/2020 | Finlow-Bates | H04L 9/0643 |
| 2020/0120084 A1* | 4/2020 | Cheng | G06F 21/31 |

FOREIGN PATENT DOCUMENTS

| | | |
|---|---|---|
| CN | 108038786 A | 5/2018 |
| CN | 108322465 A | 7/2018 |
| CN | 108510250 A | 9/2018 |
| CN | 108711108 A | 10/2018 |
| CN | 108965339 A | 12/2018 |
| CN | 109242699 A | 1/2019 |
| CN | 109637637 A | 4/2019 |
| CN | 109947848 A | 6/2019 |
| CN | 110020526 A | 7/2019 |
| CN | 110047008 A | 7/2019 |
| CN | 110245472 A | 9/2019 |
| CN | 111353903 A | 6/2020 |
| KR | 20190069728 A | 6/2019 |

* cited by examiner

NETWORK IDENTITY PROTECTION METHOD AND DEVICE, AND ELECTRONIC EQUIPMENT AND STORAGE MEDIUM

CROSS-REFERENCE TO RELATED APPLICATIONS

This application is a continuation of International Patent Application No. PCT/CN2020/098484, filed on Jun. 28, 2020, which claims the benefit of priority from Chinese Patent Application No. 202010120877.X, filed on Feb. 26, 2020. The content of the aforementioned application, including any intervening amendments thereto, is incorporated herein by reference in its entirety.

TECHNICAL FIELD

This application relates to network security technology, and more particularly to a network identity protection method and device, and electronic equipment and a computer-readable storage medium.

BACKGROUND

In the field of internet insurance, Qihoo 360 Technology Co., Ltd. has launched a search compensation plan. Specifically, the Qihoo 360 Technology Co., Ltd. assumes the liability for the advance compensation when the users encounter the direct property losses due to phishing, fraud or counterfeiting of official websites, authorized applications or web sites while using the applications or web sites provided by the 360 search engine. In addition, major banks have also launched account banking, online banking, and capital insurance to provide theft protection. Tencent, Alipay, and Suning Finance (Suning Holdings Group Co., Ltd.) have also launched account security insurance accordingly. If users suffer losses caused by the theft of the security card online banking and security card mobile banking bound in the applications are stolen and cause, they will receive the compensation.

In the above-mentioned schemes, the user's identity insurance is limited to its own application and only insures the property accounts. Moreover, the claim settlement procedures are cumbersome, and the claim settlement certificate data is stored in the central database, which is less trustworthy. In addition, the identity information of users for most applications or websites cannot be secured.

Consequently, it is urgently required for those skilled in the art to solve the technical problem that how to insure and automatically settle claims for users' network identity.

SUMMARY

An objective of this application is to provide a network identity protection method and device, and electronic equipment and a computer-readable storage medium to insure the user's network identity and perform automatic claim settlement.

In a first aspect, this application provides a method for network identity protection, wherein the method is applied to block chain network; and the method comprises:

after receiving a claim settlement request of target account information, obtaining all first transaction credentials corresponding to the target account information from a smart contract; wherein the target account information is configured for login to a target application or website; the first transaction credentials are configured to record login information corresponding to all login requests uploaded by a server of the target application or website;

obtaining all second transaction credentials corresponding to the target account information from blockchain nodes in the blockchain network; wherein the second transaction credentials are configured to record login information corresponding to login requests for normally authorized login to the target application or website; and comparing the first transaction credentials with the second transaction credentials to respond to the claim settlement request.

In an embodiment, the method for network identity protection further comprises:

when the server allows a first login request for login the target application or website, receiving the first transaction credentials sent by the server and storing, by the smart contract, the first transaction credentials sent by the server; and when the server allows a second login request for login to the target application or website through the blockchain network, performing consensus on a login permission transaction corresponding to the second login request by using the blockchain nodes in the blockchain network; and saving the login permission transaction corresponding to the second login request in the blockchain; wherein the login permission transaction comprises the second transaction credentials.

In an embodiment, the method for network identity protection further comprises:

when the server allows a password change request of a target account, returning the target account information to a password manager to allow the password manager to change a password of the target account; wherein the target account information comprises the target account and a hidden value of a new password generated by the server; and after receiving an insurance request for the target account information, creating a target smart contract corresponding to the target account information.

In an embodiment, the step of "receiving the first transaction credentials sent by the server and storing, by the smart contract, the first transaction credentials sent by the server" comprises:

receiving the first transaction credentials corresponding to the target account information sent by the server and storing, by the target smart contract, the first transaction credentials corresponding to the target account information sent by the server; and the step of "obtaining all first transaction credentials corresponding to the target account information from a smart contract" comprises:

obtaining the first transaction credentials corresponding to the target account information from the target smart contract.

In an embodiment, the method for network identity protection further comprises:

receiving an insurance transaction corresponding to the target account information broadcasted by a password manager; and determining an insurance institution corresponding to the insurance transaction; and after the blockchain nodes in the blockchain network reach consensus with respect to the insurance transaction; and saving the insurance transaction in the blockchain.

In an embodiment, the step of "comparing the first transaction credentials with the second transaction credentials to respond to the claim settlement request" comprises:

when there is a transaction credential among the first transaction credentials that does not belong to the second transaction credentials, determining that an abnormal login occurs, and claim settlement procedures are successfully triggering;

when there is a transaction credential among the second transaction credentials that does not belong to the first transaction credentials, determining that an abnormal missing occurs, and the claim settlement procedures are successfully triggered.

In an embodiment, the method for network identity protection comprises:

obtaining a random character string and an identifier of the target application or website from the server by a client to generate a public key and a private key; and obtaining an account configured to log in to the target application or web site from the password manager based on the identifier;

generating a second login request via the password manager by the client and broadcasting the second login request to the blockchain network by the client, so as to allow the blockchain nodes corresponding to the target application or web site in the blockchain network to send the second login request to the server for verification; wherein the second login request comprises the random character string, the identifier, the public key, the account, and the second transaction credentials;

receiving the login permission transaction via the blockchain network by the client; and accessing the server via a login token in the login permission transaction;

wherein the login permission transaction further comprises a login permission information identifier corresponding to the second login request; and the step of "receiving the login permission transaction via the blockchain network by the client" comprises: calculating the login permission information identifier corresponding to the second login request by the client; calling a blockchain interface to obtain a login permission transaction corresponding to the login permission information identifier from the blockchain network.

In an embodiment, the method for network identity protection further comprises:

when the client receives the password change request of the target account, determining the target application or website corresponding to the target account;

broadcasting original account information corresponding to the target account to the blockchain network via the password manager by the client, so as to allow the blockchain nodes corresponding to the target application or web site in the blockchain network to send the original account information to the server corresponding to the target website in the blockchain network for verification; wherein the original account information comprises an account number and an old password of the target account;

receiving the target account information sent by the server by the client; changing the old password of the target account in the password manager into the new password by the client.

In an embodiment, the step of "generating a second login request via the password manager by the client and broadcasting the second login request to the blockchain network by the client, so as to allow the blockchain nodes corresponding to the target application or web site in the blockchain network to send the second login request to the server for verification" further comprises:

generating the second login request and a one-time receiving address of the blockchain nodes corresponding to the target application or website via the password manager by the client;

broadcasting the second login request to the blockchain network via the password manager by the client to allow the blockchain nodes corresponding to the target application or website to obtain the second login request based on the one-time receiving address; and sending the second login request to the server for verification.

In an embodiment, the step of "generating the second login request and a one-time receiving address of the blockchain nodes corresponding to the target application or website via the password manager by the client" further comprises:

generating the second login request and a transaction identifier via the password manager by the client; and generating the one-time receiving address of the blockchain nodes corresponding to the target application or website using the transaction identifier.

In an embodiment, the login permission transaction is information after ring signature, and a signer in the ring signature is the blockchain nodes connected to the server of the target application or web site in the blockchain network.

In a second aspect, this application provides a device for network identification protection, comprising:

a first acquisition module;

a second acquisition module; and a comparison module;

wherein the first acquisition module is configured to obtain first transaction credentials corresponding to the target account information from the smart contract, after receiving a claim settlement request of the target account information; wherein the target account information is configured for login to a target application or website; and the first transaction credentials are configured to record login information corresponding to all login requests uploaded by a server of the target application or web site;

the second acquisition module is configured to obtain all second transaction credentials corresponding to the target account information from blockchain nodes in the blockchain network; wherein the second transaction credentials are configured record login information corresponding to login requests for normally authorized login to the target application or website; and the comparison module is configured to compare the first transaction credentials with the second transaction credentials to respond to the claim settlement request.

In an embodiment, the comparison module further comprises:

a first trigger unit; and a second trigger unit;

wherein the first trigger unit is configured to determine that the abnormal login occurs and claim settlement procedures are triggered, when the there is a transaction credential among the first transaction credentials that does not belong to the second transaction credentials;

the second trigger unit is configured to determine that the abnormal missing occurs and the claim settlement procedures are triggered, when the there is a transaction credential among the second transaction credentials that does not belong to the first transaction credentials.

In a third aspect, this application provides an electronic equipment, comprising:

a memory; and a processor;

wherein the memory is configured to store a computer program; and the processor is configured to execute the computer program to implement the steps of the network identity protection method mentioned above.

In a fourth aspect, this application provides a computer-readable storage medium, wherein a program is stored on the computer-readable storage medium; and the computer program is executed by the processor to implement the network identity protection method mentioned above.

Compared with the prior art, this application has the following beneficial effects.

In the network identity protection method provided herein, when receiving a claim settlement request of target account information, all first transaction credentials corresponding to the target account information are obtained from a smart contract, where the target account information is configured for login to a target application or website; the first transaction credentials are configured to record login information corresponding to login requests uploaded by a server of the target application or website. All second transaction credentials corresponding to the target account information are obtained from blockchain nodes in a blockchain network, where the second transaction credentials are configured to record login information corresponding to login requests for normally authorized login to the target application or website. All the first transaction credentials are compared with all the second transaction credentials to respond to the claim settlement request.

Furthermore, the first transaction credentials are uploaded to the smart contract by the server of the application or website through corresponding blockchain nodes in the blockchain network, including the login information corresponding to all login transactions that request login (namely, not only including the normally authorized login (login via the password manager), but also including attack login. When the claim settlement request is received, the second transaction credentials are obtained from the blockchain nodes as the login information for login to the target application or web site through the blockchain network via the password manager. The first transaction credentials in the smart contract are compared with the second transaction credentials to perform the automatic claim settlement. In conclusion, the network identity protection method provided herein perfects the network identity insurance based on blockchain technology and realizes the automatic claims settlement. In addition, this application further discloses a network identity protection device, electronic equipment and a computer-readable storage medium.

It should be understood that the above descriptions are only exemplary, and are not intended to limit this application.

BRIEF DESCRIPTION OF THE DRAWINGS

In order to make the technical solutions in the embodiments of this disclosure or the prior art clearer, the accompanying drawings required in the description of the embodiments or the prior art are briefly introduced below. Obviously, presented in the accompanying drawings are merely some embodiments of this disclosure. It should be understood that other drawings can be obtained by those skilled in the art based on these accompanying drawings without paying any creative effort. The accompanying drawings are intended to promote the understanding of this disclosure and form a part of the specification. The accompanying drawings and the embodiments below are intended to explain this disclosure, but not to limit this disclosure.

DETAILED DESCRIPTION OF EMBODIMENTS

This application will be described in detail below with reference to the accompanying drawings and embodiments. Obviously, described below are only some embodiments of this application, which are not intended to limit the disclosure. It should be understood that all other embodiments obtained by those skilled in the art based on the content disclosed herein without paying creative effort shall fall within the scope of this application.

Figure 1:
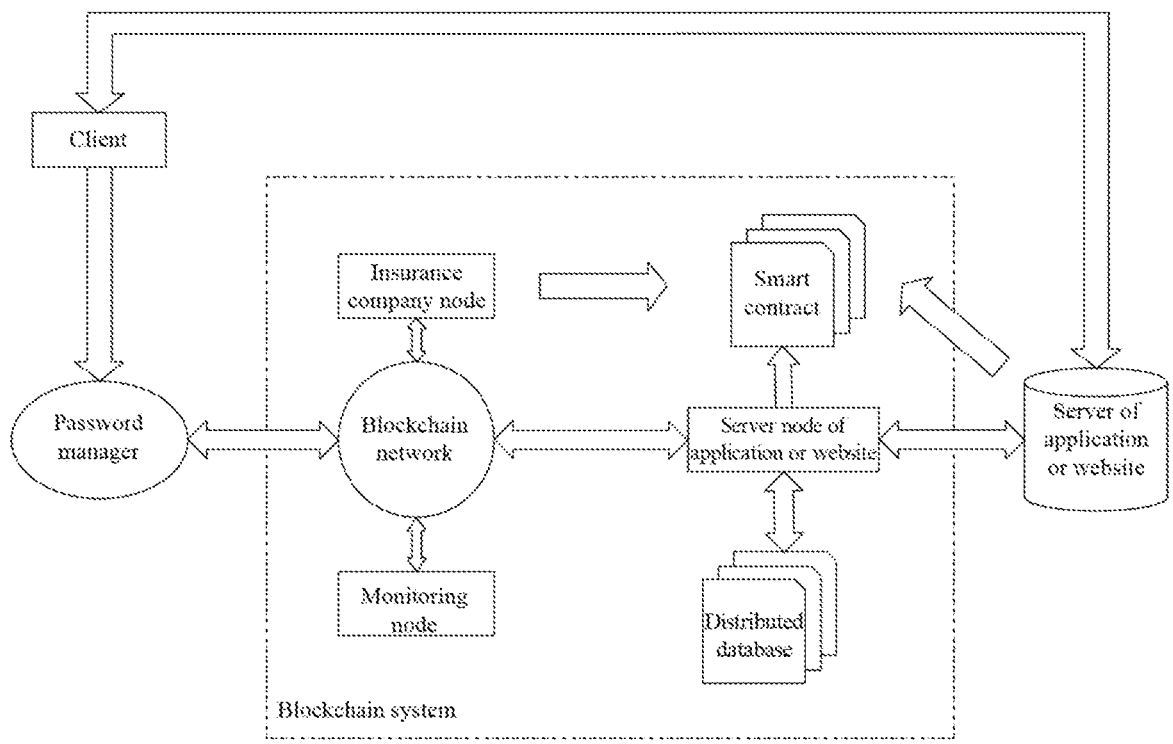
FIG. 1 is a structural diagram of a network identity protection system according to an embodiment of this disclosure.

In order to facilitate the understanding of the network identity protection method provided herein, a system used therein will be introduced below. Referring to an embodiment shown in FIG. 1, a structural diagram of a system for network identity protection according to an embodiment of this disclosure is provided. As shown in FIG. 1, the system includes a client, a password manager, a blockchain network, a server node of an application or a website, the server of the application or the website, a distributed database, an insurance company node, a monitoring node and a smart contract.

The client is mainly installed with an application (APP), a browser and a browser plug-in. The password manager is mainly configured to not only store and manage the user's application or website information, such as account information used for logging into the application or website, but also authorize the login requested by the client, call the blockchain system interface to generate transactions, and so on. The blockchain network has a point-to-point communication network structure, which establishes a carrier for information interaction between the password manager and the server node of the application or website. The different server nodes of the application or website are configured to be responsible for docking with the server of the application or web site in the blockchain system, maintain the security of the blockchain system, perform consensus of the transaction and store the transaction in the blockchain. The server of the application or website is configured to store and verify the network identity information of the user and provide business services for the client. The distributed database is a decentralized consensus data storage library of the blockchain, which is configured to store the consensus data of the server node of the application or the website and the insurance company node. The insurance company node is configured to participate in the consensus and the storage of the data in the blockchain and provide users with insurance services. The monitoring nodes are configured to authorize and manage the blockchain system and generate the smart contract of the insurance for the server node of the application or the web site and the insurance company node. The smart contract is one of the function modules of the blockchain, and mainly configured to insure the user and perform automatic claim settlement.

This application provides a method for network identity protection to render the network identity of the user an insurance and an automatic claim settlement.

Figure 2:
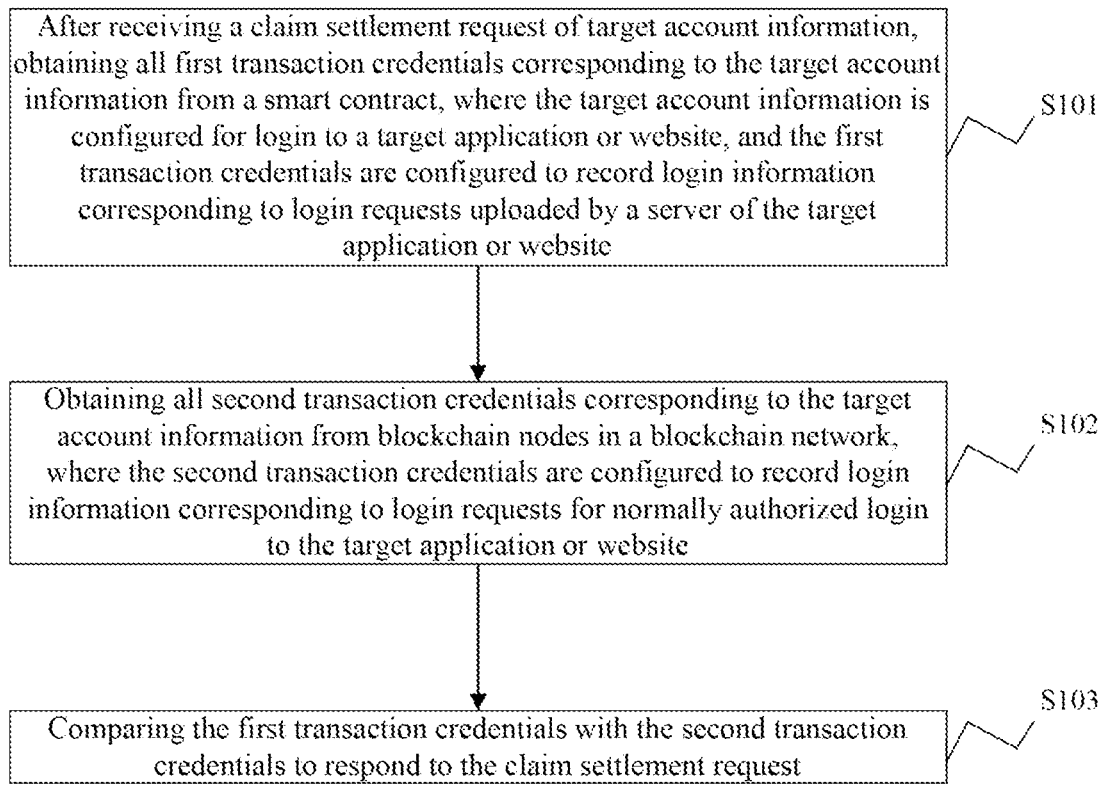
FIG. 2 is a flowchart of a network identity protection method according to an embodiment of this disclosure.

Referring to an embodiment shown in FIG. 2, the network identity protection method is performed mainly through the following steps.

(S101) After receiving a claim settlement request of the target account information, all first transaction credentials corresponding to the target account information are obtained from the smart contract. The target account information is configured for login to a target application or website. The first transaction credentials are configured to record login information corresponding to all login requests uploaded by a server of the target application or website.

In this embodiment, the execution subject is a blockchain network to realize automatic claim settlement for the network identity. If the user insures the corresponding network identity of the account and finds that the account is abnormal or the loss occurs, the claim settlement can be applied via the password manager. The user is allowed to apply new password for the target account, and cover insurance on the new target account information. In this embodiment, when the server allows the password change request of a target account, the target account information is returned to a password manager, so as to allow the password manager to change a password of the target account, where the target account information includes the target account and a hidden value of a new password generated by the server. Specifically, the hiding methods are allowed to be hashing, encryption, salting, etc., which are not limited herein.

In this embodiment, the password change process is performed as follows. The user enters the password manager to select the application or web site to change the password, and generate a password modification transaction (application or website account and old password encrypted by the public key of the target server node, and public key signature of the user), call the interface of the blockchain system to broadcast the transaction. After receiving the password modification transaction and verifying that the password modification transaction is correct, the password of the account of the application or website is decrypted via the private key of the server node of the target application or web site. The server node of the target application or website encrypts the account and password via the public key of the server of the target application or web site, and then sends the encrypted account and password to the server of the target application or web site. The server of the target application or web site uses the private key to perform decryption, so as to obtain the account password of the application or the website. After verifying the account password is correct, the user is allowed to change the new password, and a hidden value of the new password is generated. After obtaining the hidden value of the new password by encryption using the public key of the server node of the target application or website, the server node of the target application or web site generates an allowable purchase transaction (hashed value of the user's account, signature of the server node of the target application or web site), and then adds the hash value of the user's account in the corresponding smart contract insurance after broadcasting the consensus, that is, allows the user to insure the account information. In this embodiment, after receiving an insurance request of the target account information, the target smart contract corresponding to the target account information is created. The server node of the target application or website generates a password modification-allowing transaction (account of the application or website encrypted by the user's public key, the hidden value of the password, smart contract address, and signature of the server node of the target application or website), which is then broadcasted to the blockchain system for on-chain consensus through the server node of the of the target application or web site. The password manager calls the interface of the blockchain system to obtain the password modification-allowing transaction. The user's private key is used for decryption to obtain the hidden value of a strong password, which is then stored in the password manager locally or in the cloud.

After the password of the target account is modified, the user is allowed to insure the account information. In this embodiment, the insurance transaction corresponding to the target account information broadcasted by the password manager is received to determine the insurance institution corresponding to the insurance transaction. After all the blockchain nodes in the blockchain network reach the consensus with respect to the insurance transaction, the insurance transaction is stored on the blockchain.

In this embodiment, the user is allowed to generate the insurance transaction via the password manager. The insurance transaction includes a smart contract insurance address, an account hash, a token, etc. The password manager is configured to broadcast the insurance transaction to the blockchain system. After that, the insurance is performed successfully by performing consensus on the insurance transaction with all blockchain nodes in the blockchain network and storing the insurance transaction in the blockchain. It is understandable that the blockchain network can include a plurality of insurance company nodes, such that the user is allowed to choose different insurance companies.

The first transaction credentials in the smart contract are uploaded via the blockchain nodes of the application or website. In this embodiment, when the server allows the first login request for login to the target application or web site, the first transaction credentials sent by the server are received, and then first transaction credentials are stored by the smart contract. The first transaction credentials are configured to store the login information corresponding to all login transactions of the user's account, including normal authorized login (password manager login) and attack login. The login information can be in the following forms: {E (timestamp, AppID, account Hash, unique identifier of the login device, login mode, etc.), HashProof1 (timestamp, AppID, account Hash, unique identifier of the login device, login mode, etc.)}, where HashProof1 is the first transaction credential.

(S102) The second transaction credentials corresponding to the target account information are obtained from blockchain nodes in the blockchain network. The second transaction credentials are configured to record login information corresponding to login requests for normally authorized login to the target application or website, such as {E (timestamp, AppID, account Hash, unique identifier of login device, login mode and other information), HashProof2 (timestamp, AppID), account Hash, unique identifier of login device, login mode, etc.)}, where HashProof2 is the second transaction credential. In this embodiment, when the server allows the second login request for login to the target application or web site through the blockchain network, the consensus is performed on the login permission transaction corresponding to the second login request by using the blockchain nodes in the blockchain network, and then the login permission transaction is saved in the blockchain. The login permission transaction includes the second transaction credentials The process of using the password manager for login to the target application or website through the blockchain network is performed as follows. The user enters the login page of the application or website in the client. The server of application or website generates a random string, and returns the random string and the identifier of the application or website to the client. At the same time, the client generates a public key 1CSK and a private key 1CPK and stores them in a cache. The user uses the master password and other verification to open the password manager, and decrypts the account information stored locally or in the cloud. The quick response code (QR code) for login of the application or web site or browser is scanned to extract the login information. The password manager calls the blockchain interface to broadcast the login request transaction to the blockchain system. The login request transaction can include a random string generated by the application or website, the identifier of the application or website, the public key generated by the client, the account information for login to the application or website, the second transaction credentials and user signature, and the signature corresponding to the second transaction credentials. The second transaction credential provided herein can include a timestamp, an identifier of the application or web site, an account Hash, a unique identifier of the user's device, a login mode. The server node of the application or website receives the login request transaction, uses the private key to decrypt the network identity information, and then encrypts it with the public key of server node of the application or web site and sends it to the corresponding server node of the application or website. The server of the application or website decrypts to obtain the network identity information, and returns login permission information to the server node of the application or website after successful verification. The login permission information may include the hash value corresponding to the random string, the login token, etc. When decrypting to obtain login permission information, the server node of the application or website generates the login permission transaction and broadcast the login permission transaction to the blockchain network. The login permission transaction can include information such as the hash value corresponding to the random string, the hash value of the account, the login token and the second transaction credentials, and digital signatures. After the login permission transaction is verified to be correct by the server node of other application or website, the login permission transaction is subjected to consensus and stored in the blockchain. The client calls the interface of the blockchain system and uses the hash value corresponding to the random string to obtain the login permission transaction after consensus, and uses the 1CSK to decrypt the login permission information such as login token. The client carries the login token to re-access the server of the application or website. After the server of the application or website verifies that the login permission information such as login token is correct, it returns to the login page after successful login.

(S103) The claim settlement request is responded by comparing all the first transaction credentials and all the second transaction credentials.

In this step, the first transaction credentials are compared with the second transaction credentials. When there is a transaction credential among the first transaction credentials that does not belong to all the second transaction credentials, it is determined that an abnormal login occurs, and claim settlement procedures are triggered. When there is a transaction credential among the second transaction credentials that does not belong to all the first transaction credentials, it is determined that an abnormal missing occurs, and the claim settlement procedures are triggered. After triggering the claim settlement procedures, the claim settlement is performed successfully. Except for the above two successful claim settlement situations, it is determined that the claim settlement has failed. The claim settlement fails under multiple situations such as "when the first transaction credential and the second transaction credential correspond to the same value", "when the digital signature is incorrect", and "when the claim settlement information provided by the user (including target account information, etc.) is incorrect", which are not specifically imitated herein.

Regarding the network identity protection method provided herein, the first transaction credentials are uploaded to the smart contract by the server of the application or website through the corresponding blockchain nodes in the blockchain network, including the login information corresponding to all login transactions of the login requests, that is, including not only the normal authorized login (login by the password management), but also attack logins. When the claim settlement request is received, the second transaction credentials are obtained from the blockchain nodes. The second transaction credentials are the normal authorized login information for login the target application or website. The first transaction credentials are compared with the second transaction credentials in the smart contract to perform the automatic claim settlement. In conclusion, the network identity protection method provided herein fills the gap of network identity insurance and achieves automatic claims settlement.

A method for network identity protection is provided herein. Compared with the previous embodiment, this embodiment further illustrates and optimizes the technical solution, which is specifically performed through the following steps.

Figure 3:
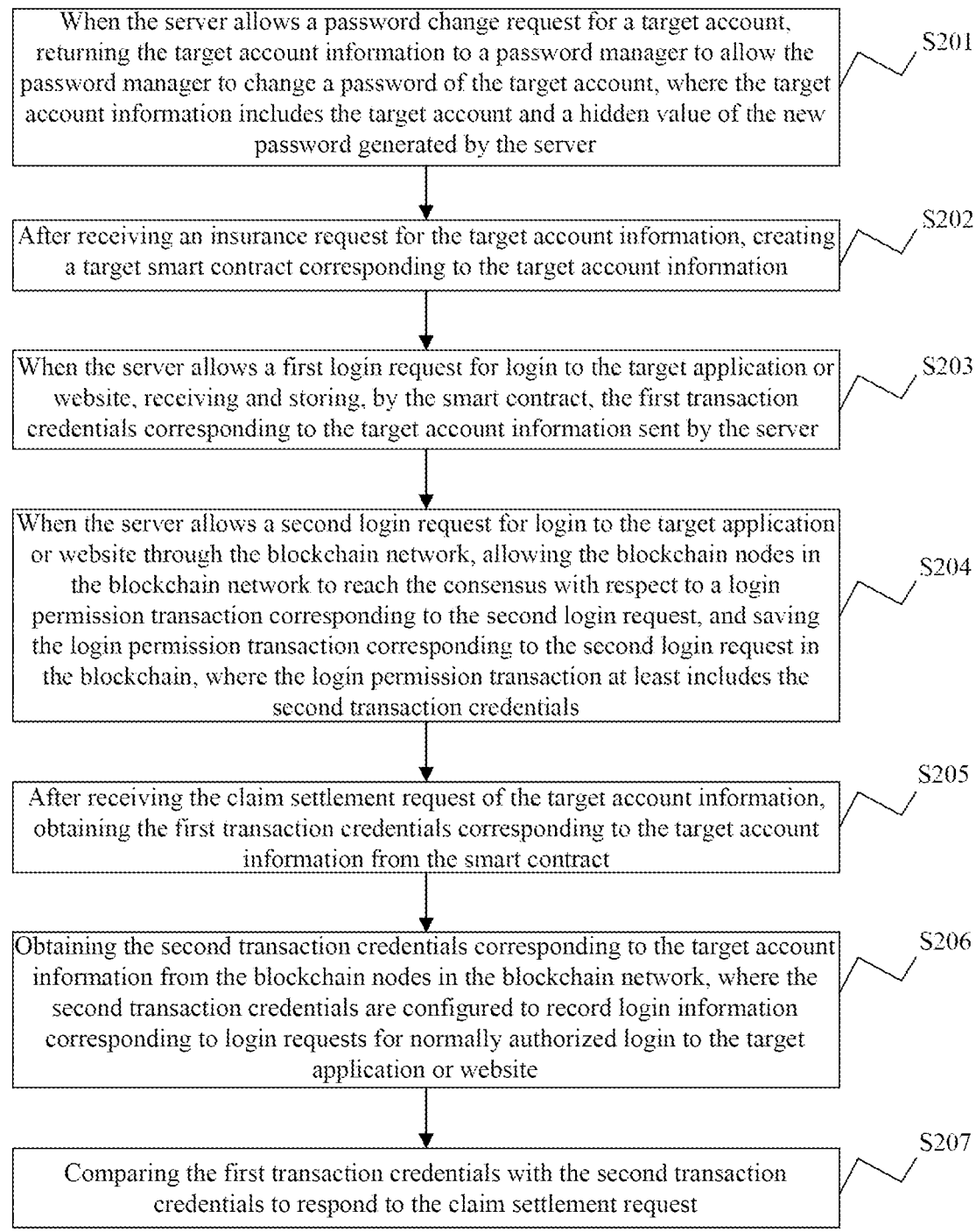
FIG. 3 is a flowchart of a network identity protection method according to another embodiment of this disclosure.

Referring to an embodiment shown in FIG. 3, a flowchart of another network identity protection method according to an embodiment of this disclosure is provided herein. The method is performed as follows.

(S201) When the server allows a password change request of a target account, the target account information is returned to a password manager, so as to allow the password manager to change a password of the target account. The target account information includes the target account and a hidden value of the new password generated by the server.

(S202) After receiving an insurance request for the target account information, a target smart contract corresponding to the target account information is created.

(S203) When the server allows a first login request for login to the target application or website, the first transaction credentials corresponding to the target account information sent by the server is received, and then stored by the smart contract.

(S204) When the server allows a second login request for login to the target application or website through the blockchain network, the consensus is performed on the login permission corresponding to the second login request by using the blockchain nodes in the blockchain network, and the login permission transaction corresponding to the second login request is stored in the blockchain. The login permission transaction includes the second transaction credentials.

(S205) After receiving the claim settlement request of the target account information, all the first transaction credentials corresponding to the target account information are obtained from the smart contract.

(S206) All the second transaction credentials corresponding to the target account information are obtained from the blockchain nodes in the blockchain network. The second transaction credentials are configured to record login information corresponding to login requests for normally authorized login to the target application or website.

(S207) The first transaction credentials are compared with the second transaction credentials to respond to the claim settlement request.

In this embodiment, each account has a corresponding smart contract. The user insures the account information, and the insurance transaction is stored in the blockchain. The target smart contract is constructed corresponding to the account is established. All login information corresponding to the account for login to the target application or website is uploaded to the target smart contract. After the user applies for a claim, all transaction credentials in the target smart contract are taken as all first transaction credentials, which are compared with the second transaction credentials corresponding to the account obtained from the blockchain nodes, so as to respond to the claim settlement request.

The process for changing the new password by the user through the client is performed by the following steps.

(S301) When the client receives the password change request of the target account, the target application or website corresponding to the target account is determined.

In this embodiment, the execution subject is the client. Specifically, the user is allowed to send the password change request of the target account to the client. The original account information of the target account includes the account number and old password of the target account, which is configured for login to the target application or website.

(S302) The original account information corresponding to the target account is broadcast to the blockchain network via the password manager by the client, so as to allow the blockchain nodes corresponding to the target application or web site in the blockchain network to send the original account information to the server corresponding to the target website in the blockchain network for verification. The original account information includes an account number and an old password of the target account.

In this step, the password modification transaction is generated by the password manager and broadcast to the blockchain network. the new password modification request includes the above-mentioned original account information. At the same time, the user's signature can be broadcast, which is not specifically limited herein. After the server node of the target application or website receives the password modification transaction and verifies that the password modification transaction is correct, the private key of the server node of the target application or website is configured to decrypt the original account information, and send the original account information to the target application or website.

(S303) The client receives the target account information sent by the server.

(S304) The client changes the old password of the target account in the password manager into the new password.

In this embodiment, after the server of the target application or website verifies that the account password is correct, the new password is generated based on the old password, and the target account information is returned to the corresponding blockchain nodes. The target account information includes the target account number and the hidden value of the new password. The blockchain nodes decrypts the target account information, and generates a password modification-allowing transaction, broadcasts the password modification-allowing transaction to the blockchain system, and performs the consensus on the password modification-allowing transaction and store the password modification-allowing transaction on chain. The password manager calls the blockchain interface to obtain the password modification-allowing transaction. The new password is obtained after decryption, and is stored in the decentralized password manager or the personal cloud.

The process of using the password manager for login to the target application or website through the blockchain network is performed as follows.

(S401) A random character string and an identifier of the target application or website are obtained from the server by a client to generate a public key and a private key. An account information for login to the target application or website is obtained from the password manager based on the identifier.

In this embodiment, the executive subject is the client, and a third-party application that needs to use the server resources of the application or website is installed in the client. The user enters the login page of the application or website in the client. The sever of the application or website generates a random string and returns the random string and the identifier of the application or web site to the client. At the same time, the client generates a public key 1CSK and a private key 1CPK, and saves the public key 1CSK and the private key 1CPK in the cache. The user opens the password manager with authentication such as the master password, and decrypts the account information stored locally or in the cloud.

(S402) The client generates and broadcasts the second login request through the password manager to the blockchain network, so as to allow the blockchain nodes corresponding to the target application or website in the blockchain network to send the second login request to the server for verification. The second login request comprises the random character string, the identifier, the public key, the account, and the second transaction credentials.

In this step, the quick response code (QR code) for login of the application or website or browser is scanned to extract the login information. The password manager calls the blockchain interface to broadcast the second login request to the blockchain system. The second login request may include a random string generated by the application or website, the identifier of the application or website, the public key generated by the client, the account information for login to the application or website, the second transaction credentials and the user's signature, the signature for the second transaction credentials, etc. The second transaction credentials provided herein may each include a timestamp, an identifier of an application or website, an account Hash, a unique identifier of the user's device, a login mode. The second login request is allowed to be encrypted to ensure the security of data transmission using the public key of the server node of the application or the website. The blockchain node corresponding to the server of the application or website in the blockchain network searches the transaction list to obtain the login request transaction, uses the private key of the server node of the application or web site to decrypt the login request transaction, and sends the login request transaction to the corresponding server of the application or web site through the network. The server of the application or web site decrypts and verifies the received information.

It should be noted that the password manager is allowed to broadcast login request transactions to the blockchain network by means of one-time stealth address technology, which is mainly intended to hide the real address of the receiver, and realize the untraceability. An equation of a stealth address is expressed as: $P=Hs(rA)G+B$, where P is a one-time receiving address of the receiver; Hs is a hash function; r is a random number generated by the transaction sender, which is only known by the sender; A is a viewing public key of the receiver; B is a payment public key of the receiver; G is a point on an elliptic curve; and $R=rG$ is a transaction public key, which is published in the transaction.

The receiver checks whether the transaction is sent to itself from the transaction list, which is expressed as $P'=Hs(aR)G+B$, where P' is a stealth address generated by the transaction receiver based on the transaction public key R and the viewing private key and the payment private key of the transaction receiver. x is a one-time use private key generated by the transaction receiver based on the transaction public key R, and the viewing private key and the payment private key of the transaction receiver.

In a network identity authorization login system based on the blockchain, the different server nodes of the application or website jointly maintain the same blockchain system, and perform interaction of user's information in the system. In order to achieve protection of privacy such as user traffic between different server nodes of the application or website, the stealth address technology is applied to hide the real address of the receiver (server node of application or web site), and the ring signature technology is applied to hide the real address of the transaction initiator (server node of application or website). The login permission information is the information after ring signature, and the signer in the ring signature is the blockchain node that accesses the server of the application or website in the blockchain network.

Specifically, the step of "the client generates and broadcasts the second login request through the password manager to the blockchain network, so as to allow the blockchain nodes corresponding to the target application or web site in the blockchain network to send the second login request to the server for verification" is specifically performed as follows. The second login request and the one-time receiving address of the blockchain nodes corresponding to the target application or web site are generated via the password manager. The second login request is broadcast to the blockchain network by the password manager, such that the blockchain nodes corresponding to the target application or web site obtains the second login request by using the one-time receiving address, and sends the second login request to the server for verification.

In this embodiment, the password manager obtains the QR code information and decrypts the account information stored in the password manager, and then generates the second login request. The receiver is the blockchain node corresponding to the server of the application or website. In order to hide the address of the blockchain node, the decentralized password manager generates a random number r, and calculates the transaction identifier, which is expressed as $R=rG$ to disclose it in the transaction. The equation $P=Hs(rA)G+B$ is calculated according to the viewing public key A and the payment public key B of the blockchain node, and is taken as the one-time receiving address of the blockchain node for the login request transaction. The step of "The second login request and the one-time receiving address of the blockchain nodes corresponding to the target application or website are generated via the password manager" is specifically performed as follows. The password manager generates the second login request and transaction identifier, and uses the transaction identifier to generate the one-time receiving address of the blockchain node corresponding to the target application or website.

Each blockchain node checks the transaction list, and obtains the transaction sent to itself by calculating $P'=Hs(aR)G+B$ based on the transaction identifier $R=rG$ and the viewing private key and the payment public key B of its own. After obtaining the encrypted information such as login token, the blockchain nodes corresponding to the server of the application or web site generate a second login request and perform a ring signature. The signer set of the ring signature is the blockchain node corresponding to server of the application or website. After verifying that the second login request is correct by the blockchain nodes corresponding to the serves of other applications or websites, the second login request is subjected to on-chain consensus. When verifying the ring signature, it is only proved that the real signer is one of the blockchain nodes corresponding to the server of each application or web site.

(S403) The client receives the login permission transaction through the blockchain network, and uses the login token in the login permission transaction to access the server.

In this embodiment, when verified to be correct by the server, the login permission transaction is returned to the server node of the application or the website. The login permission transaction may include the login permission information identifier corresponding to the second login request (for example, the hash value corresponding to the random string) and the login token. The login token provided herein may include Cookie and Token, both of which are configured for accessing the server. The blockchain nodes broadcast the login permission information to the blockchain network. After decrypting the login permission information, the server node of the application or website generates a login permission transaction and broadcasts the login permission transaction to the blockchain network. The login permission transaction can include information such as the hash value corresponding to the random string, the hash value of the account, the login token corresponding to the second transaction credentials, and digital signatures. After verifying that the login permission transaction is correct by the server nodes of other application or website, the login permission transaction is stored in the blockchain after that server nodes of other application or website reach consensus with respect to the login permission transaction. The client calculates the login permission information identifier (that is, the hash value corresponding to the random string) corresponding to the second login request, calls the interface in the blockchain system to obtain the login permission transaction corresponding to the login permission information identifier from the blockchain network, and uses the 1CSK to decrypt the login permission information such as login token. The client carries the login token to re-access the server of the application or the website. When the server of the application or the website verifies that the information, such as login token, is correct, it returns to the login page after successful login.

Described below provides a network identity protection device. The network identity protection device and the network identity protection method mentioned above can be mutually referred.

Figure 4:
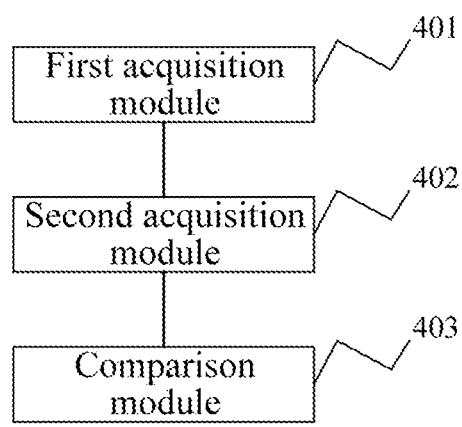
FIG. 4 is a structural diagram of a network identity protection device according to an embodiment of this disclosure.

The network identity protection device is structurally in FIG. 4. As shown in FIG. 4, the device includes a first acquisition module 401, a second acquisition module 402 and a comparison module 403.

The first acquisition module 401 is configured to obtain all first transaction credentials corresponding to the target account information from the smart contract, after receiving a claim settlement request of the target account information. The target account information is configured for login to a target application or website. The first transaction credentials are configured to record login information corresponding to all login requests uploaded by a server of the target application or website.

The second acquisition module 402 is configured to obtain all second transaction credentials corresponding to the target account information from blockchain nodes in the blockchain network. The second transaction credentials are configured to record login information corresponding to login requests for normally authorized login to the target application or web site.

The comparison module 403 is configured to compare the first transaction credentials with the second transaction credentials to respond to the claim settlement request.

Regarding the network identity protection device provided herein, the first transaction credentials are uploaded to the smart contract by the server of the application or website through the corresponding blockchain nodes in the blockchain network, including the login information corresponding to all login transactions of the login requests, that is, including not only the normal authorized login (login by the password management), but also attack logins. When the claim settlement request is received, the second transaction credentials are obtained from the blockchain nodes. The second transaction credentials are the normal authorized login information for login the target application or website. The first transaction credentials are compared with the second transaction credentials in the smart contract to perform the automatic claim settlement. In conclusion, the network identity protection device provided herein fills the gap of network identity insurance and achieves automatic claims settlement.

Based on the foregoing embodiments, in this embodiment, the device for network identity protection further includes a first storage module and a second storage module.

The first storage module is configured to receive the first transaction credentials sent by the server and store the first transaction credentials sent by the server via the smart contract, after the server allows the first login request for login the target application or website.

The second storage module is configured to perform consensus on the login permission transaction corresponding to the second login request by using the blockchain nodes in the blockchain network, and store the login permission transaction corresponding to the second login request in the blockchain, after the server allows the second login request for login the target application or web site through the blockchain network. The login permission transaction includes the second transaction credentials.

Based on the above-mentioned embodiments, the device provided in this embodiment further includes a return module and a creation module.

The return module is configured to return the target account information to the password manager after the server allows the password change request of the target account, such that the password manager is allowed to change the password of the target account. The target account information includes the target account and the hidden value of the new password generated by the server.

The creation module is configured to create a target smart contract corresponding to the target account information after the insurance request of the target account information is received.

Based on the above-mentioned embodiments, specifically, the storage module is configured to receive the first transaction credentials corresponding to the target account information sent by the server, and store the first transaction credentials corresponding to the target account information sent by the server via the target smart contract, after the server allows the login request for login to the target application or web site.

Specifically, the first acquisition module 401 is configured to obtain all the first transaction credentials corresponding to the target account information from the target smart contract, after the claim settlement request of the target account information is received.

Based on the above-mentioned embodiments, this device provided herein further includes a first determining module and a third storage module.

The first determining module is configured to receive the insurance transaction corresponding to the target account information broadcasted by the password manager, and determine the insurance institution corresponding to the insurance transaction.

The third storage module is configured to store the insurance transaction in the blockchain, after the blockchain nodes in the blockchain network reach consensus with respect to the insurance transaction Based on the above-mentioned embodiments, this device provided herein further includes a first trigger unit and a second trigger unit.

The first trigger unit is configured to determine that the abnormal login occurs and claim settlement procedures are triggered, when the there is a transaction credential among the first transaction credentials that does not belong to the second transaction credentials.

The second trigger unit is configured to determine that the abnormal missing occurs and the claim settlement procedures are triggered, when the there is a transaction credential among the second transaction credentials that does not belong to the first transaction credentials.

Based on the above-mentioned embodiments, the client includes a third acquisition module, a first broadcast module and a first receiving module.

The third acquisition module is configured to obtain a random character string and an identifier of the target application or web site from the server, generate a public key and a private key, and obtain the account information for login to the target application or website from the password manager based on the identifier.

The first broadcast module is configured to generate and broadcast the second login request to the blockchain network through the password manager, such that the blockchain node corresponding to the target application or website in the blockchain network sends the second login request to the server for verification. The second login request includes the random character string, the identifier, the public key, and the account information.

The first receiving module is configured to receive the login permission transaction through the blockchain network, and use the login token in the login permission transaction to access the server.

Based on the above-mentioned embodiments, the login permission transaction further includes an identifier of the login permission information corresponding to the second login request. Specifically, the first receiving module is configured to calculate the identifier of the login permission information corresponding to the second login request, and call the blockchain interface to obtain a module of the login permission transaction corresponding to the identifier of the login permission information from the blockchain network.

Based on the above-mentioned embodiments, the client further includes a second determining module, a second broadcast module and a second receiving module.

The second determining module is configured to determine the target application or website corresponding to the target account when a password change request of the target account is received.

The second broadcasting module is configured to broadcast the original account information corresponding to the target account to the blockchain network through the password manager, such that the blockchain node corresponding to the target application or website sends the original account information to the server of the target application or web site for verification. The original account information includes the account number and old password of the target account.

The second receiving module is configured to receive the target account information sent by the server. The client is configured to change the old password of the target account in the password manager into the new password.

Based on the above-mentioned embodiments, the first broadcast module includes a generation unit and a broadcast unit.

The generation unit is configured to generate the second login request and the one-time receiving address of the blockchain node corresponding to the target application or website through the password manager.

The broadcast unit is configured to broadcast the second login request to the blockchain network through the password manager, such that the blockchain node corresponding to the target application or website obtains the second login request based on the one-time receiving address, and send the second login request to the server for verification.

Based on the above-mentioned embodiments, specifically, the generation unit is configured to generate the second login request and the transaction identifier via the password manager, and use the transaction identifier to generate the one-time receiving address of the blockchain nodes corresponding to the target application or web site.

Based on the above-mentioned embodiments, the login permission transaction is the information after the ring signature. The signer of the ring signature is the blockchain node, where the server of the application or website is connected to the blockchain network.

Regarding the device provided herein, the specific manner on how each module performs has been described in detail in the embodiment of the method provided herein, which are not specifically described herein.

Figure 5:
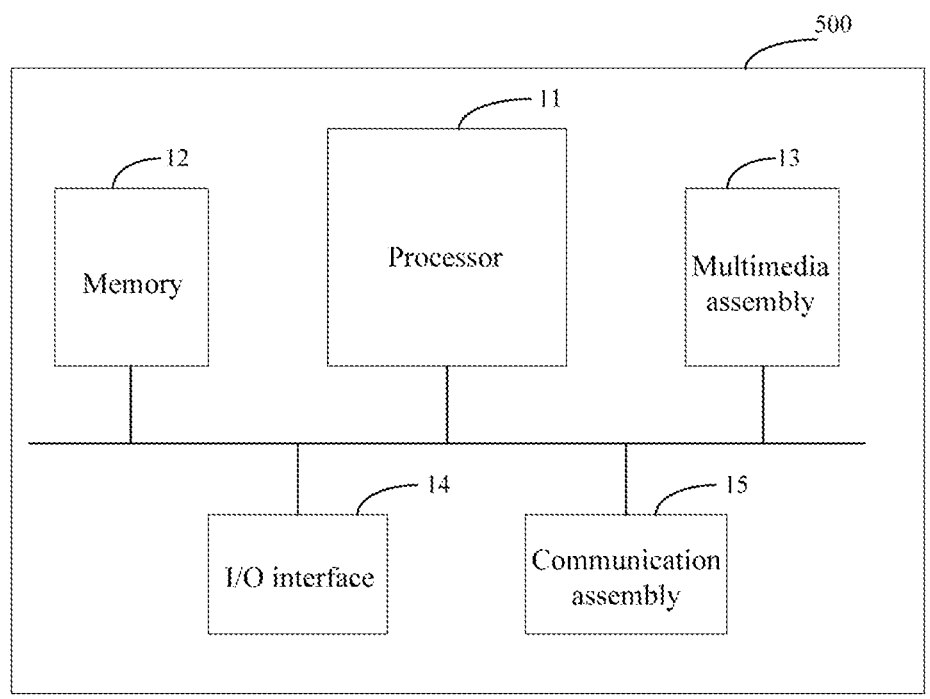
FIG. 5 is a structural diagram of electronic equipment according to an embodiment of this disclosure.

Referring to an embodiment shown in FIG. 5, an electronic equipment is further provided, and the structure of the electronic equipment 500 is exhibited. The electronic equipment 500 includes a processor and a memory. The electronic equipment 500 can further include one or a combination of a multimedia assembly 13, an input/output (I/O) interface 14 and a communication assembly 15.

The processor 11 is configured to control the operation of the electronic equipment 500 to complete all or part of the steps in the method for network identity protection. The memory 12 is configured to store various types of data to support operations on the electronic equipment 500. These data may include, for example, instructions for any application or method that operates on the electronic equipment 500, and the data related to the application, such as contact data, messages sent and received, pictures, audio, video, etc. The memory can be achieved by one or a combination of any type of volatile or non-volatile storage device, such as static random access memory (SRAM), electrically erasable programmable read-only memory (EEPROM), erasable programmable read-only memory (EPROM), programmable read-only memory (PROM), read-only memory (ROM), magnetic memory, Flash memory, disk or CD. The multimedia assembly 13 may include a screen and an audio component. For example, the screen may be a touch screen. The audio component is configured to input/output audio signals. For example, the audio component can include a microphone configured to receive the outer audio signals. The received audio signals are allowed to be further stored in the memory 12 or sent through the communication assembly 15. The audio component also includes at least one speaker configured for outputting audio signals. The I/O interface 14 provides an interface between the processor 11 and other interface modules, such as keyboard, mouse, button, etc. These buttons can be virtual buttons or physical buttons. The communication component 15 is configured to perform wire communication or wireless communication between the electronic equipment 500 and other devices. For example, the wireless communication can be performed through one or a combination of WiFi, Bluetooth, near field communication (NFC), and 2G, 3G, or 4G. Thus, the corresponding component 15 can include a Wi-Fi module, a Bluetooth module and a NFC module.

In this embodiment, the electronic equipment 500 may be implemented by one or a combination of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, and is configured to implement the method for network identity protection provided herein.

In another embodiment, a computer-readable storage medium including program instructions is further provided. The program instructions are allowed to be executed by a processor to implement the method for network identity protection provided herein. For example, the computer-readable storage medium can be a memory 12 including program instructions. The program instructions are allowed to be executed by a processor 11 of the electronic equipment 500 to perform the method for network identity protection provided herein.

The embodiments are described in a progressive manner. The differences of each embodiment from other embodiments are described in detail, and the same or similar parts between the embodiments can be referred to each other. Since the device is corresponding to the method disclosed herein, the description of the device is relatively simple, and the relevant information can be referred to the description of the method. It should be noted that any improvements and modifications made by those skilled in the art without departing from the spirit of this application should fall within the scope of this application defined by the appended claims.

It should be noted that as used herein, relational terms such as "first" and "second" are merely intended to distinguish one entity or operation from another entity or operation, and do not necessarily require or imply an actual relationship or order between these entities or operations. Furthermore, the terms "comprise", "include", "contain" and any other variations are intended to mean a nonexclusive inclusion, such that a process, method, article, or instrument not only includes those listed elements, but also includes those that are not clearly listed, or those elements that are inherent to such a process, method, article, or instrument. Without further restrictions, the elements defined by the phrase "comprising . . . " do not exclude the existence of other identical elements in the process, method, article, or instrument comprising the elements.

What is claimed is:

1. A network identity protection method for a blockchain network, comprising:
    after receiving a claim settlement request of target account information, verifying whether the target account information is correct;
    if the target account information is correct, obtaining all first transaction credentials corresponding to the target account information from a smart contract;
    wherein the target account information is configured for login to a target application or website; the first transaction credentials are configured to record login information corresponding to all login requests uploaded by a server of the target application or website; and the first transaction credentials each comprise a first timestamp, a first application identifier, a first account hash, a first unique identifier of a login device and a first login mode;
    obtaining all second transaction credentials corresponding to the target account information from blockchain nodes in the blockchain network; wherein the second transaction credentials are configured to record login information corresponding to login requests for normally authorized login to the target application or website; and the second transaction credentials each comprise a second timestamp, a second application identifier, a second account hash, a second unique identifier of the login device and a second login mode; and
    comparing the first transaction credentials with the second transaction credentials;
    when there is a transaction credential among the first transaction credentials that does not belong to the second transaction credentials, determining that an abnormal login occurs, triggering, by the server, a password change request of a target account, returning the target account information to a password manager to allow the password manager to change a password of the target account, and performing a claim settlement; and
    when there is a transaction credential among the second transaction credentials that does not belong to the first transaction credentials, determining that an abnormal missing of login transaction from the second transaction credentials occurs, triggering, by the server, the password change request of the target account, returning the target account information to the password manager to allow the password manager to change the password of the target account, and performing the claim settlement; wherein the target account information comprises the target account and a hidden value of a new password generated by the server; and
    if the target account information is incorrect, determining that the claim settlement is unsuccessful.

2. The network identity protection method of claim 1, further comprising:
    when the server allows a first login request for login to the target application or website, receiving the first transaction credentials sent by the server and storing, by the smart contract, the first transaction credentials sent by the server; and
    when the server allows a second login request for login to the target application or website through the blockchain network, performing consensus on a login permission transaction corresponding to the second login request by using the blockchain nodes in the blockchain network, and storing the login permission transaction corresponding to the second login request in blockchain; wherein the login permission transaction comprises the second transaction credentials.

3. The network identity protection method of claim 2, further comprising:
    after receiving an insurance request for the target account information, creating a target smart contract corresponding to the target account information.

4. The network identity protection method of claim 3, wherein the step of "receiving the first transaction credentials sent by the server and, storing, by the smart contract, the first transaction credentials sent by the server" comprises:
    receiving the first transaction credentials corresponding to the target account information sent by the server, and storing, by the target smart contract, the first transaction credentials corresponding to the target account information sent by the server; and
    the step of "obtaining all first transaction credentials corresponding to the target account information from a smart contract" comprises:
    obtaining the first transaction credentials corresponding to the target account information from the target smart contract.

5. The network identity protection method of claim 1, further comprising:
    receiving an insurance transaction corresponding to the target account information broadcasted by a password manager; and determining an insurance institution corresponding to the insurance transaction; and
    after the blockchain nodes in the blockchain network reach consensus with respect to the insurance transaction, saving the insurance transaction in blockchain.

6. An electronic equipment, comprising:
    a memory; and
    a processor;
    wherein the memory is configured to store a computer program; and the processor is configured to execute the computer program to implement the network identity protection method of claim 1.

7. A non-transitory computer-readable storage medium, wherein a computer program is stored on the non-transitory computer-readable storage medium; and the computer program is executed by a processor to implement the network identity protection method of claim 1.

* * * * *